(12) United States Patent
Fox et al.

(10) Patent No.: US 8,325,657 B2
(45) Date of Patent: Dec. 4, 2012

(54) REDUCING INTERFERENCE IN A TELECOMMUNICATIONS NETWORK

(75) Inventors: David Fox, Newbury (GB); Prakash Bhat, Newbury (GB)

(73) Assignee: Vodaone Intellectual Property Licensing Limited, Berkshire (GB)

( * ) Notice: Subject to any disclaimer, the term of this patent is extended or adjusted under 35 U.S.C. 154(b) by 108 days.

(21) Appl. No.: 12/452,581

(22) PCT Filed: Jul. 10, 2008

(86) PCT No.: PCT/GB2008/002359
§ 371 (c)(1),
(2), (4) Date: May 25, 2010

(87) PCT Pub. No.: WO2009/007722
PCT Pub. Date: Jan. 15, 2009

(65) Prior Publication Data
US 2010/0246503 A1    Sep. 30, 2010

(30) Foreign Application Priority Data
Jul. 10, 2007   (GB) ................................. 0713338.2

(51) Int. Cl.
*H04W 4/00* (2009.01)
(52) U.S. Cl. ......... 370/329; 370/208; 370/342; 455/450
(58) Field of Classification Search .................. 370/329, 370/208, 342; 455/450
See application file for complete search history.

(56) References Cited

U.S. PATENT DOCUMENTS

| 2004/0190482 A1* | 9/2004 | Baum et al. | 370/347 |
| 2008/0049851 A1* | 2/2008 | Nangia et al. | 375/260 |
| 2008/0095133 A1* | 4/2008 | Kodo et al. | 370/342 |

FOREIGN PATENT DOCUMENTS

| EP | 1 936 829 A1 | 6/2008 |
| WO | WO2006/007318 A1 | 1/2006 |
| WO | WO2007/044281 A1 | 4/2007 |

* cited by examiner

*Primary Examiner* — Ricky Ngo
*Assistant Examiner* — Richard K Chang
(74) *Attorney, Agent, or Firm* — Muirhead and Saturnelli, LLC

(57) ABSTRACT

Controlling interference in a telecommunications network, in which data are transmitted between mobile devices and base stations in resource blocks, includes, for each of the base stations: allocating resource blocks to one of multiple resource groups, the corresponding resource blocks of each base station being in the same resource group; allocating resource groups to one of multiple transmission power values, the corresponding resource groups of each base station having different transmission power values; and allocating respective ones of the mobile devices to one of the resource groups depending upon a UE characteristic. Interference at a resource block of a resource group of a base station caused by a neighboring base station is detected. In response thereto, an indication of the resource group subject to interference is sent to the neighboring base station and then the transmission power value of said resource group of the neighboring base station is selectively reduced.

20 Claims, 2 Drawing Sheets

REDUCING INTERFERENCE IN A TELECOMMUNICATIONS NETWORK

TECHNICAL FIELD

The present invention relates to a method of controlling interference in a telecommunications network comprising a plurality of base stations and a plurality of mobile devices, and in which data are transmitted between each mobile device and base station in resource blocks. The invention also relates to a corresponding apparatus.

BACKGROUND OF THE INVENTION

In a cellular or mobile telecommunications network, each base station (BS) corresponds to a respective cell of the cellular or mobile telecommunications network and receives calls from and transmits calls to a mobile terminal in that cell by wireless radio communication. Such a subscriber's mobile terminal is shown at 1 in FIG. 1. The mobile terminal may be a handheld mobile telephone, a personal digital assistance (PDA) or a laptop computer equipped with a datacard.

Key elements of a Long Term Evolution (LTE) network are shown in FIG. 1. The base stations 2, 3 and 5 comprise an eNodeB (evolved Node B, eNB) 7. The RRC signalling with the mobile terminal 1 terminates at the eNodeB 7, the eNode B comprising the Radio Access Network (RAN) of the LTE network. The eNodeB 7 performs the functions of both the Node B and a large part of the RNC of a 3G/UMTS network. The network core 11 of the LTE network includes Serving Gateway (S-GW) 13, Packet Data Network Gateway (PDN-GW) 15, the HLR/HSS 17 (e.g. a common HLR/HSS shared with the network core of a GSM/UMTS network) and also Mobility Management Entity (MME) 19. A plurality of PDN-GWs are usually provided, although only one is shown. The LTE network communicates with an external packet data network PDN 21.

The LTE physical layer is based on Orthogonal Frequency Division Multiplexing scheme (OFDM) to meet the targets of high data rate and improved spectral efficiency.

The spectral resources are allocated/used as a combination of both time ("slot") and frequency units ("subcarrier"). The smallest unit of allocation is a subframe of two slots corresponding to two resource blocks (RBs). A resource block is 12 sub-carriers for a half a sub-frame (0.5 ms).

For LTE there needs to be a method to allow neighbouring cells to co-exist, and this requires the common radio resource blocks that interfere to be shared in a "soft" manner between neighbouring cells. The soft sharing is not measured by number of resource blocks which is used in the system, but by the amount of interference that can be introduced into the neighbour cell for each of the resource blocks.

If a cell detects too much interference in the uplink, it has been proposed that an overload indication is passed between eNodeBs controlling neighbour cells, allowing them to inform each other that they are injecting too much interference (Rise Over Thermal) on a specific resource.

These known proposals are directed to congestion situations, and do not allow the system to intelligently adapt for the non-uniform distributions of UEs in the coverage area of a particular eNB, as in the known arrangement the radio resources would need to be co-ordinated between neighbouring cells in proportion to the amount of UEs registered with or camped on each eNB, and neither does the known arrangement address differential QoS requirements of neighbouring cells.

It has been a broad design assumption that when the eNB has data to transmit on a sub-carrier it would transmit on the sub-carrier at a constant Maximum power. Each sub carrier would be configured with a Maximum power, and the value could vary between sub-carriers. For the centre 1.25 MHz of the carrier the eNB would need to maintain its transmit power as this is what UEs will be making measurements of, and using these measurements to determine whether to select and reselect to/from this cell, so these need to be constant.

Accordingly, it would be desirable to provide an improved arrangement of reducing interference.

SUMMARY OF THE INVENTION

1. According to a first aspect of the present invention, there is provided a method of controlling interference in a telecommunications network comprising a plurality of base stations and a plurality of mobile devices, and in which data are transmitted between each mobile device and base station in resource blocks, the method including:

for each of said base stations, allocating respective ones of said resource blocks to one of a plurality of resource groups such that each resource group comprises a plurality of resource blocks, the corresponding resource blocks of each base station being in the same resource group;

for each of said base stations, allocating each one of said resource groups to one, of a plurality of transmission power values, the corresponding resource groups of each base station having different ones of said transmission power values;

for each of said base stations, allocating each one of said mobile devices to one of the plurality of resource groups in dependence upon a characteristic of the mobile device;

detecting interference at a resource block of a resource group of one of said base stations caused by a neighbouring one of said base stations;

in response to said detecting, sending to said neighbouring base station an indication of the resource group subject to interference; and in response to said indication, selectively reducing the transmission power value of said resource group of said neighbouring base station.

In the embodiments, each resource group comprises a plurality of resource blocks. The resource blocks are blocks in the time and frequency domain. Each resource group comprises to the same resource blocks in the time and frequency domain in neighbouring base stations. The transmission power value of the resource blocks of the same resource block in neighbouring cells is different. Because at each base station each of the mobile devices is allocated to one of the plurality of resource groups in dependence upon a characteristic of the mobile device (which characteristic is indicative of the power that should be used for communications of that mobile device), at neighbouring base stations, mobile devices having similar characteristics will use a resource group having a similar power, those resource groups comprising different resource blocks of the neighbouring base stations.

The transmission power values are maximum transmission power values in the embodiments to be described.

The characteristic of the mobile device may be timing advance and/or path loss, or some other indication of the radio conditions between the mobile device and its base station.

The characteristic of the mobile device may the priority of its data transmissions. For example, the priority may be based on the type of data transmitted by the device (e.g. voice/streaming/internet), or may based on the type of use of the device (e.g. emergency services and others).

The step of selectively reducing the transmission power value of said resource group of said neighbouring base station may comprise reducing the transmission power by a predetermined step, e.g. step-Down-size (in dBm).

The step of selectively reducing the transmission power value of said resource group of said neighbouring base station may comprise reducing the transmission power independence upon the relative priorities of the mobile devices of the said one of said base stations and said neighbouring base station allocated to the resource group subject to interference. If the neighbouring base station has a lower priority, then transmission power may be reduced by a predetermined step, e.g. step-Down-size (in dBm), but if the neighbouring base station has a higher priority, then transmission power may not be reduced or may only be reduced if this is possible without affecting quality of service.

In the embodiments, the telecommunications network comprises a Long Term Evolution (LTE) network—i.e. a network that uses an Orthogonal Frequency Division Multiplexing scheme (OFDM).

BRIEF DESCRIPTION OF THE DRAWINGS

For a better understanding of the present invention embodiments will now be described by way of example, with reference to the accompanying drawings, in which.

DETAILED DESCRIPTION OF VARIOUS EMBODIMENTS

Figure 1:
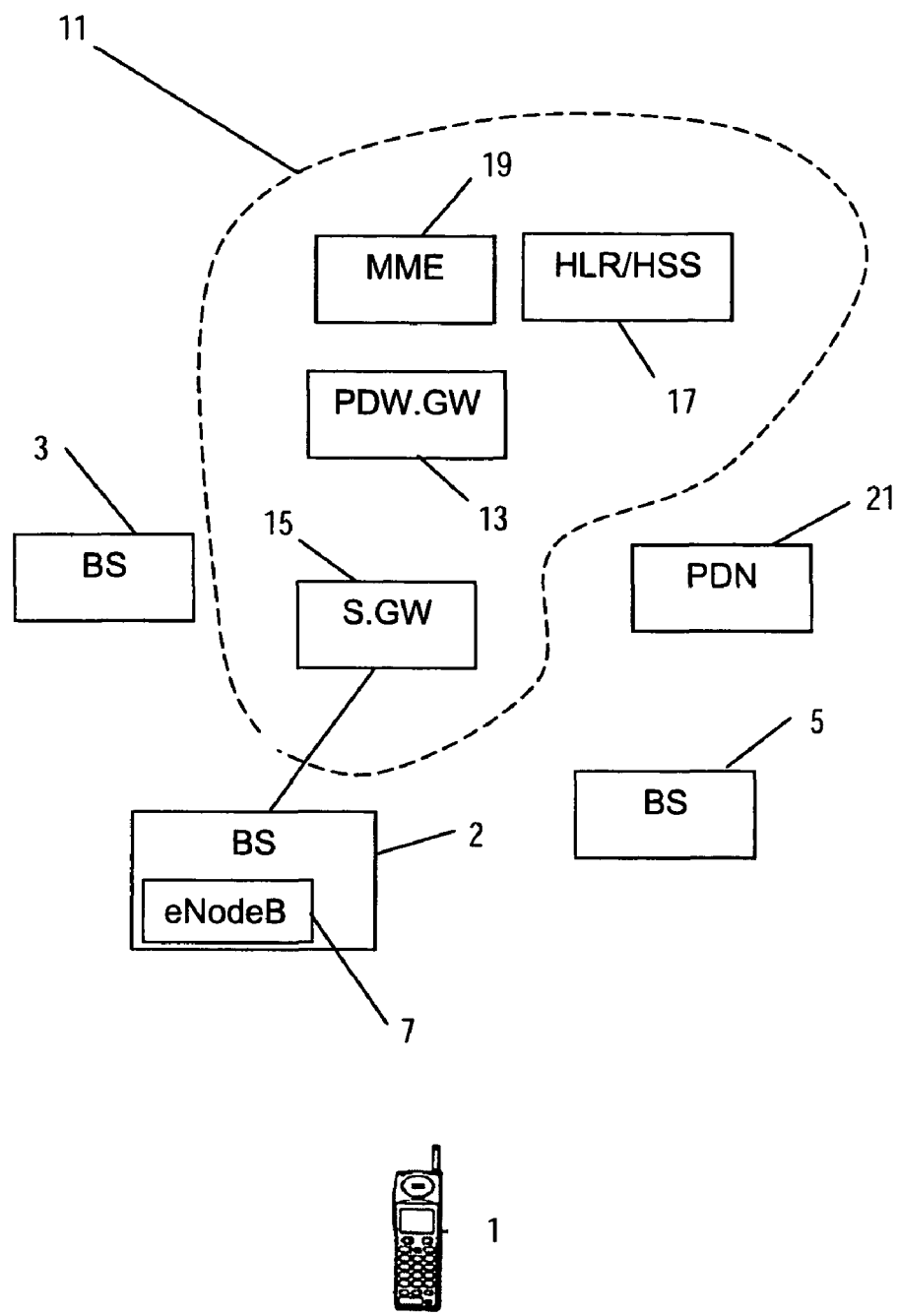
FIG. 1 is a diagrammatic drawing of key elements of An LTE mobile telecommunications network.
Figure 2:
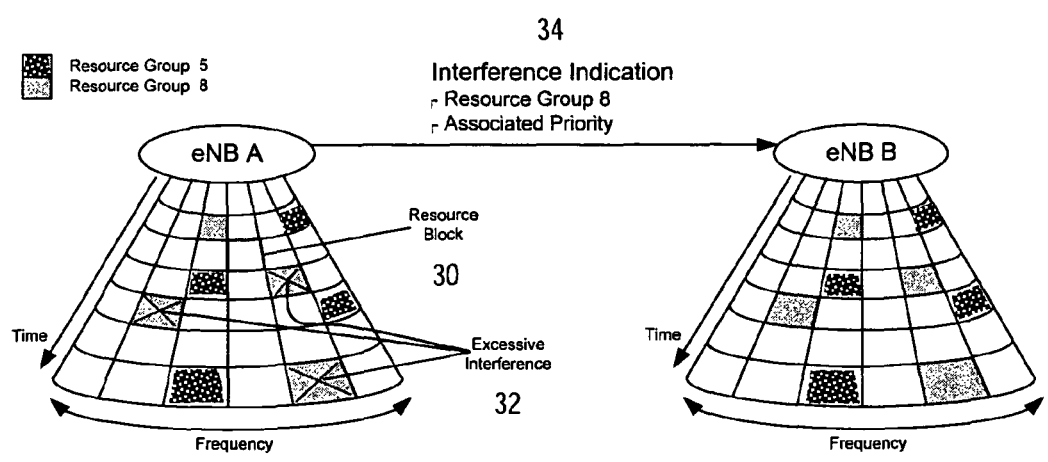
FIG. 2 is a diagrammatic drawing of two neighbouring eNBs, showing the distribution of RGs in the time and frequency domains.

The embodiments to be described relate to an LTE network. In accordance with a feature of the embodiments, as shown in FIG. 2, the Resource Blocks 30 are grouped into a number of Resource Groups (RGs), e.g. 100, in a standardised or operator configured manner in a known pattern in the time and frequency domain. The Resource Block and Resource Group mapping is common for all neighbouring eNBs. A Resource Group is an allocation defining a reoccurring pattern of Resource Blocks at a plurality of eNBs.

The resource blocks 30 of eNB A and eNB B are divided into RGs, such as "Resource Group 5" and "Resource Group 8".

In the embodiments:—
a) Each eNB is configured with the definition of the Resource Groups (i.e. in terms of set of subcarriers, at a given time, for a given duration).
b) Each eNB is configured with absolute maximum transmit power for each RG.
c) For each Resource Group, each eNB is configured with the step-Down-size (in dBm) to be used by the eNB when it reduces (backoffs) the transmit power on the sub-carriers of the Resource Blocks that make up the Resource Group. Some step sizes can be configured with size 0, meaning that the eNB does not reduce the transmit power for those sub-carriers.
d) Each eNB is configured with a Global step-UP-size (in dBm) to be used by the eNB when it tries to increase the transmit power on its sub-carriers (up to its maximum transmit power).
e) Each eNB is configured with a step-UP-timer for each RG, which is used by the eNB to control how frequently the eNB increases the transmit power of the sub-carriers by the step-UP-size, up to their specific configured maximum.

Splitting the available resource into RGs allows a future transmission and therefore interference level to be reduced on a given resource. (This allows the system to be able to predict the future interference level on a given resource, based on the current received interference.)

The eNB uses the maximum power configured for each of the RGs to order the RGs based on maximum transmit power. Each cell neighbouring cell would be configured with a different RG/maximum transmit power order. The eNB uses this order to schedule the UEs depending on their power requirements.

In accordance with another feature of the embodiments, a predefined method is used to assign a priority to any transmissions on a RG. Users making transmissions of a particular priority are grouped together as much as possible on a specific Resource Group.

According to a first embodiment, the UEs with similar Timing Advance and Pathloss are grouped together in their radio Resource Block allocations. The timing advance value corresponds to the length of time a signal from the mobile terminal takes to reach the eNB. Path Loss occurs when RF (Radio Frequency) waves are transmitted through the air. This loss occurs due to atmospheric influences and interaction with objects, which can have a filtering effect on the signal. The Path Loss value corresponds to loss between the mobile terminal and the eNB.

The eNB uses the maximum power configured for each of the RG to order the RGs, based maximum transmit power. Each cell neighbouring cell would be configured with a different order. The eNB uses this order to schedule the UEs depending on their power requirements, those with a higher Pathloss/Timing Advance are given the RG with higher max transmit power, whereas the UEs with the least Pathloss/Timing Advance are given the RG with the lower max transmit power.

Each cell cells is configured with a small set of RGs to be used up to the cell edge—these are configured with a set size of 0, i.e. full power always available.

According to the first embodiment, during operation of the network, after establishment of the RGs for each eNB and allocation of UEs to each RG, the following steps are performed:—

1) When an eNodeB (eNB A) is experiencing interference at a particular RB above an acceptable level (a network operator configured threshold), as indicated at 32 in FIG. 2, it informs the cell (eNB B) causing the interference with an Interference Indication 34 (a single flag per Resource Block which says whether it experienced interference or not) that the interference is too high in the uplink. The eNodeB starts Timer $T_{interference}$.

2) If an eNodeB (eNB B) is informed that it is introducing unacceptable interference on neighbouring cell (eNB A) then the power transmitted on this RG by eNB B is reduced. This can either be achieved by scheduling other data on this RG, by changing the MCS and/or lowering the Transmit power for the Resource Group—by the step-Down-size mentioned above.

3) If the Timer $T_{interference}$ expires without a reduction in the culprit interference, the eNodeB (eNB A) should stop sending Interference Indications and re-organise which UEs/Priorities are allocated to which RGs on its cell.

According to a second embodiment, the UE resource allocations are grouped together of based on their respective Quality of Service (QoS) of the traffic being transmitted. Based on QoS of UE, Priority 1 would be voice, Priority 2 would be streaming, and Priority 3 would be Internet, for example. The UE Priority 1 data are given the RG with higher maximum transmit power.

According to a third embodiment, the UE resource allocations are grouped together of based on their respective ARP (Allocation Retention Priority). Based on the ARP of the UE, Priority 1 would be Police/Fire Service, Priority 2 would be Doctors, and Priority 3 would be other customers, for example. The UE Priority 1 data are given the RG with higher max transmit power.

In the second or third embodiment, if there are multiple RGs for a particular QoS or ARP Priority, UEs of similar Timing Advance or Pathloss should be grouped together in the same RG. That is, UEs are grouped by priority; and then grouped by Timing Advance and Pathloss.

According to the second and third embodiments, during operation of the network, after establishment of the RGs for each eNB and allocation of UEs to each RG, the following steps are performed:—

1) When an eNodeB (eNB A) is experiencing interference at a particular RB above an acceptable level (a network operator configured threshold, possibly different for each Priority), as indicated at 32 in FIG. 2, it informs the cell (eNB B) causing the interference with an Interference Indication 34 that the interference is too high in the uplink and (if appropriate) indicates the associated Priority of the usage on this RG. The eNodeB starts Timer $T_{interference}$. (In the first embodiment, information between neighbouring eNBs consists purely of a single flag per Resource Block which says whether it experienced interference or not.)

2) If an eNodeB (eNB B) is informed that it is introducing unacceptable interference on neighbouring cell (eNB A) then it looks at the Priority associated with resource on its cell:
   a. If the Interference Indication is for a lower priority then the eNodeB (eNB B) may chose to reduce the interference if it does not impact the QoS of the associated UEs, or it may ignore the indication.
   b. If the Interference Indication is for a higher Priority then the power transmitted on this RG is reduced. This can either be achieved by scheduling other data on this RG, by changing the MCS and/or lowering the Transmit power for the Resource Group—by the step-Down-size mentioned above.
   c. If the priority is the same then depending on the load of the other RGs the eNodeB should attempt to reallocate which priority of resource is allocated to this RG.

3) If the Timer $T_{interference}$ expires without a reduction in the culprit interference, the eNodeB should stop sending Interference Indications and re-organise which UEs/Priorities are allocated to which RGs on its cell.

Step-Up-timer is a timer per RG and is set (activated) whenever the eNB increases the transmit power for a RG. No further increase in eNB transmit power for a RG is allowed when associated Step-Up-Timer is active. When the Step-Up-Timer is active further indications from neighbouring eNB's are ignored. This ensures the interfered resource interference co-ordination is allowed when the Step-Up-Timer is active. This ensures the power ramp is in small steps and allows system to stabilise.

An alternative solution to the implementation of the Timer $T_{interference}$ would be for the neighbouring eNBs to acknowledge directly overload indication, including the priority of traffic being used on that RG.

In the above arrangement, when receiving an overload indicator for a Resource Block, the eNB relates it to the relevant internally defined Resource Group n. When receiving the overload indicaton, the eNB then for future transmissions on the Resource Blocks which make up the Resource Group n (e.g.) reduces the transmit power step by step until the neighbour cell stops reporting interference.

When QoS or ARP is included the number of RGs for a given time, and channel bandwidth may be increased, such that the resource allocation becomes more granular.

The embodiments have allow a greater number of higher priority flows be supported by the system, and thereby maximizing the revenue for a given interference limited system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

The invention claimed is:

1. A method of controlling interference in a telecommunications network comprising a plurality of base stations and a plurality of mobile devices, and in which data are transmitted between each mobile device and base station in resource blocks, the method comprising:
   for each of said base stations, allocating respective ones of said resource blocks to one of a plurality of resource groups such that each resource group comprises a plurality of resource blocks, the corresponding resource blocks of each base station being in the same resource group;
   for each of said base stations, allocating each one of said resource groups to one of a plurality of transmission power values, the corresponding resource groups of each base station having different ones of said transmission power values;
   for each of said base stations, allocating each one of said mobile devices to one of the plurality of resource groups in dependence upon a characteristic of the mobile device;
   detecting interference at a resource block of a first resource group of one of said base stations caused by a neighbouring one of said base stations;
   in response to said detecting, sending to said neighbouring base station an indication of the first resource group subject to interference; and
   in response to said indication, selectively reducing the transmission power value of a second resource group of said neighbouring base station.

2. The method of claim 1, wherein the transmission power values are maximum transmission power values.

3. The method of claim 1, wherein the characteristic of the mobile device includes timing advance and/or path loss.

4. The method of claim 1, wherein the characteristic of the mobile device includes the priority of its data transmissions.

5. The method of claim 1, wherein the step of selectively reducing the transmission power value of said second resource group of said neighbouring base station comprises reducing the transmission power by a predetermined step.

6. The method of claim 1, wherein the telecommunications network comprises a Long Term Evolution (LTE) network.

7. The method of claim 1, wherein the telecommunications network uses an Orthogonal Frequency Division Multiplexing scheme (OFDM).

8. The method of claim 4, wherein the priority is based on the type of data transmitted by the device.

9. The method of claim 4, wherein the priority is based on the type of use of the device.

10. The method of claim 4, wherein the step of selectively reducing the transmission power value of said second resource group of said neighbouring base station comprises reducing the transmission power in dependence upon the relative priorities of the mobile devices of said one of said base stations allocated to the first resource group subject to interference and the mobile devices of said neighbouring base station allocated to the second resource group.

11. Apparatus for controlling interference in a telecommunications network comprising a plurality of base stations and a plurality of mobile devices, and in which data are transmitted between each mobile device and base station in resource blocks, the apparatus comprising:
- a network element that allocates respective ones of said resource blocks to one of a plurality of resource groups for each of said base stations such that each resource group comprises a plurality of resource blocks, the corresponding resource blocks of each base station being in the same resource group;
- a network element that allocates each one of said resource groups to one of a plurality of transmission power values for each of said base stations, the corresponding resource groups of each base station having different ones of said transmission power values;
- a network element that allocates each one of said mobile devices to one of the plurality of resource groups for each of said base stations in dependence upon a characteristic of the UE;
- a network element that detects interference at a resource block of a first resource group of one of said base stations caused by a neighbouring one of said base stations;
- a network element that sends to said neighbouring base station an indication of the first resource group subject to interference; and
- a network element that selectively reduces the transmission power value of said a second resource group of said neighbouring base station in response to said indication.

12. The apparatus of claim 11, wherein the transmission power values are maximum transmission power values.

13. The apparatus of claim 11, wherein the characteristic of the mobile device includes timing advance and/or path loss.

14. The apparatus of claim 11, wherein the characteristic of the mobile device includes the priority of its data transmissions.

15. The apparatus of claim 11, the network element that selectively reduces the transmission power value is operable to reduce the transmission power by a predetermined step.

16. The apparatus of claim 11, wherein the telecommunications network comprises a Long Term Evolution (LTE) network.

17. The apparatus of claim 11, wherein the telecommunications network uses an Orthogonal Frequency Division Multiplexing scheme (OFDM).

18. The apparatus of claim 14, wherein the priority is based on the type of data transmitted by the device.

19. The apparatus of claim 14, wherein the priority is based on the type of use of the device.

20. The apparatus of claim 14, the network element that selectively reduces the transmission power value is operable to reduce the transmission power in dependence upon the relative priorities of the mobile devices of said one of said base stations allocated to the first resource group subject to interference and said neighbouring base station allocated to the second resource group.

* * * * *

UNITED STATES PATENT AND TRADEMARK OFFICE
CERTIFICATE OF CORRECTION

| | | |
|---|---|---|
| PATENT NO. | : 8,325,657 B2 | Page 1 of 1 |
| APPLICATION NO. | : 12/452581 | |
| DATED | : December 4, 2012 | |
| INVENTOR(S) | : Fox et al. | |

It is certified that error appears in the above-identified patent and that said Letters Patent is hereby corrected as shown below:

On the Title Page, Col. 1 should read

Item (73) Assignee: Vodafone Intellectual Property Licensing Limited, Berkshire (GB)

Signed and Sealed this
First Day of April, 2014

Michelle K. Lee
*Deputy Director of the United States Patent and Trademark Office*